United States Patent
Ibrahim et al.

(10) Patent No.: US 10,911,096 B1
(45) Date of Patent: Feb. 2, 2021

(54) SYSTEM AND METHOD FOR PROVIDING SUB-BAND WHITENING IN THE PRESENCE OF PARTIAL-BAND INTERFERENCE

(71) Applicant: Samsung Electronics Co., Ltd., Gyeonggi-do (KR)

(72) Inventors: Mostafa Sayed Roshdy Ibrahim, San Jose, CA (US); Ruchen Duan, Santa Clara, CA (US); Wook Bong Lee, San Jose, CA (US); Minki Ahn, Gyeonggi-do (KR); Hyun Bae Jeon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/664,237

(22) Filed: Oct. 25, 2019

Related U.S. Application Data

(60) Provisional application No. 62/883,862, filed on Aug. 7, 2019.

(51) Int. Cl.
| | | |
|---|---|---|
| *H04L 1/02* | (2006.01) | |
| *H04B 1/71* | (2011.01) | |
| *H04B 17/345* | (2015.01) | |
| *H04B 1/10* | (2006.01) | |
| *H04L 25/02* | (2006.01) | |
| *H04L 25/03* | (2006.01) | |

(52) U.S. Cl.
CPC ............ *H04B 1/7102* (2013.01); *H04B 1/10* (2013.01); *H04B 17/345* (2015.01); *H04L 25/022* (2013.01); *H04L 25/03159* (2013.01)

(58) Field of Classification Search
CPC . H04L 1/06; H04L 27/2647; H04L 25/03057; H04W 52/243
USPC .................. 375/347, 267, 232, 227; 370/252
See application file for complete search history.

(56) References Cited

U.S. PATENT DOCUMENTS

| | | | |
|---|---|---|---|
| 8,699,448 B2 | 4/2014 | Lindqvist et al. | |
| 8,948,312 B2 | 2/2015 | Daneshrad et al. | |
| 10,069,712 B2 | 9/2018 | Qian et al. | |
| 2011/0096796 A1* | 4/2011 | Zhang | H04B 7/0452 370/474 |
| 2013/0003814 A1* | 1/2013 | Kangas | H04B 17/26 375/227 |
| 2013/0039184 A1* | 2/2013 | Wigren | H04B 17/336 370/235 |
| 2013/0195166 A1 | 8/2013 | Reial | |
| 2013/0308480 A1 | 11/2013 | Wigren et al. | |
| 2017/0330593 A1* | 11/2017 | Higashino | G11B 20/10277 |
| 2018/0287830 A1* | 10/2018 | Merlin | H04L 25/0224 |

FOREIGN PATENT DOCUMENTS

| | | |
|---|---|---|
| CA | 2437477 | 2/2004 |

* cited by examiner

*Primary Examiner* — Khai Tran
(74) *Attorney, Agent, or Firm* — The Farrell Law Firm, P.C.

(57) ABSTRACT

A method and system for providing sub-band whitening are herein provided. According to one embodiment, a method estimating an interference whitening (IW) factor based on a legacy-long training field (LLTF) signal, updating the estimated IW factor during transmission of a data symbol, and scaling the data symbol based on the updated IW factor and the estimated IW factor.

20 Claims, 8 Drawing Sheets

__US 10,911,096 B1__

SYSTEM AND METHOD FOR PROVIDING SUB-BAND WHITENING IN THE PRESENCE OF PARTIAL-BAND INTERFERENCE

PRIORITY

This application is based on and claims priority under 35 U.S.C. § 119(e) to U.S. Provisional Patent Application filed on Aug. 7, 2019 in the United States Patent and Trademark Office and assigned Ser. No. 62/883,862, the entire contents of which are incorporated herein by reference.

FIELD

The present disclosure is generally related to wireless communication systems. In particular, the present disclosure is related to a system and method for providing sub-band whitening in the presence of partial-band interference.

BACKGROUND

In Wi-Fi communication systems, due to a contention based transmission opportunity, interference may be strong for some packets. In the Institute of Electrical and Electronics Engineers (IEEE) 802.11 ac standard and IEEE 802.11 ax standard, the transmitting bandwidth may be 80 megahertz (MHz) and 160 MHz. In a case of overlapping basic service set (BSS) (OBSS), partial-band interference may be present for wide-band (e.g., 40/80/160 MHz) that affects one or more of the available 20 MHz sub-bands and thus may cause severe performance degradation.

SUMMARY

According to one embodiment, a method includes estimating an interference whitening (IW) factor based on a legacy-long training field (LLTF) signal, updating the estimated IW factor during transmission of a data symbol, and scaling the data symbol based on the updated IW factor and the estimated IW factor.

According to one embodiment, a system includes a transceiver, a memory and a processor configured to estimate an interference whitening (IW) factor based on a legacy-long training field (LLTF) signal, update the estimated IW factor during transmission of a data symbol, and scale the data symbol based on the updated IW factor and the estimated IW factor.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
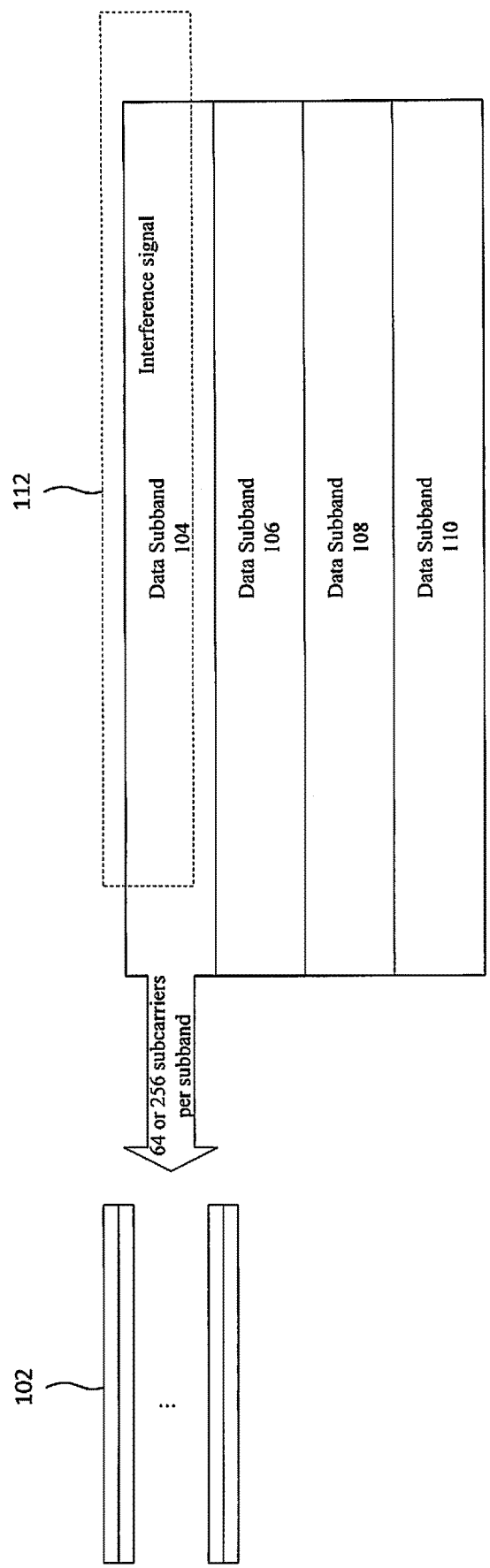
FIG. 1 illustrates a diagram of a signal structure including an interference signal, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

FIG. 1 illustrates a diagram of a signal structure including an interference signal, according to an embodiment. As depicted, the data packet 102 may include data sub-bands 104, 106, 108 and 110. As shown, an interference signal 112 is interfering with data sub-band 104, and the interference signal 112 can start and end at any part of the data packet 102.

To mitigate degradation of the signals due to partial-band interference, the present system and method provides a frequency-domain-based signal whitening (scaling) according to the estimated interference whitening (IW) factor based on an estimated noise and interference variance (NIVar) (e.g., per 20-MHz-sub-band).

A Wi-Fi packet may be divided into two parts, a preamble part and a data part. The preamble part begins with a legacy-long training field (LLTF) that provides estimations. The data part comes after the preamble part.

Figure 2A:
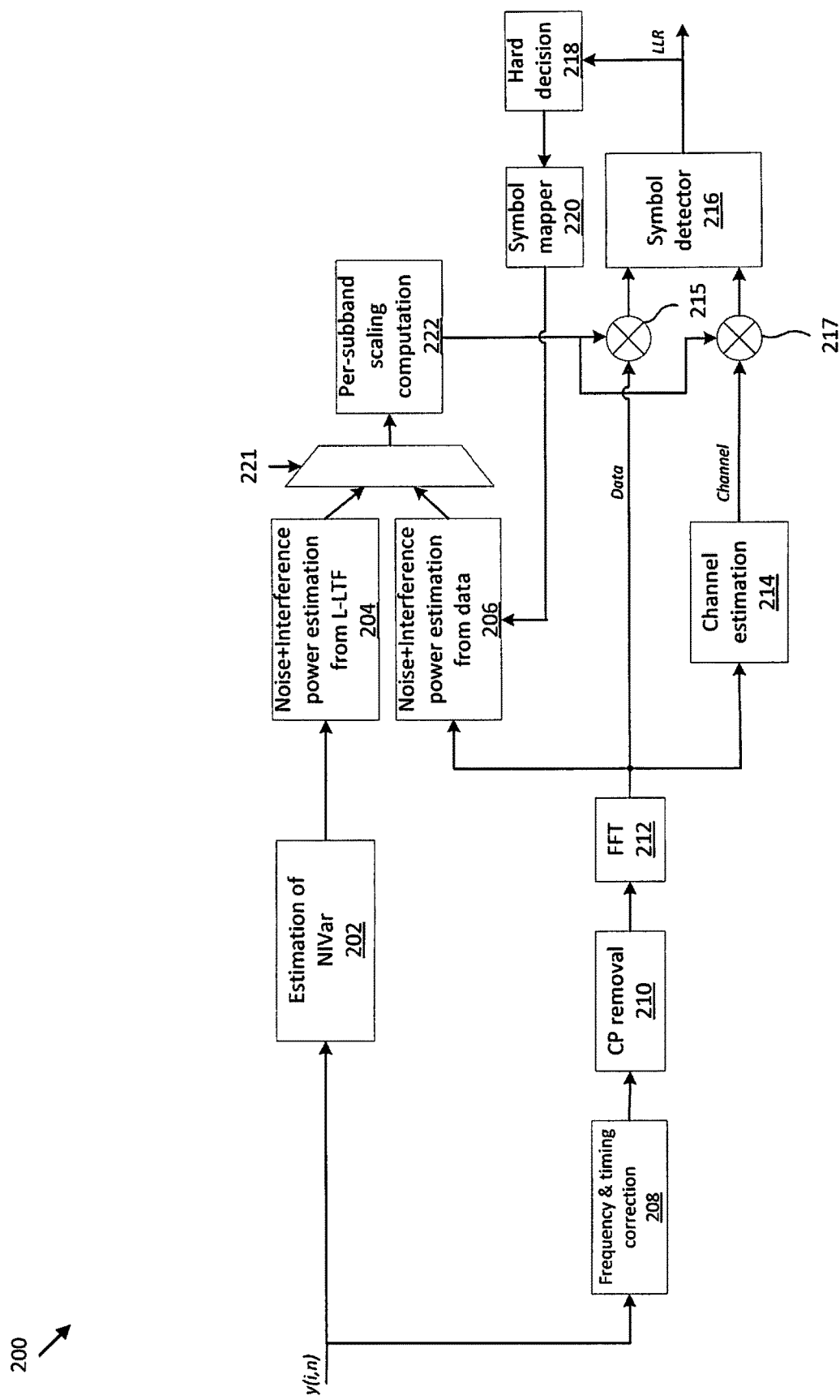
FIG. 2A illustrates a diagram of a system for providing sub-band whitening in the presence of partial-band interference, according to an embodiment.

FIG. 2A illustrates a diagram of a system for providing sub-band whitening in the presence of partial-band interference, according to an embodiment. A system 200 receives an initial signal y(i,n) for processing at the estimation of a NIVar block 202. The initial signal may be in the time domain or the frequency domain. The system includes a NIVar estimation from LLTF block 204 and a NIVar estimation from data block 206, the details of which will be described with reference to FIGS. 3-6. The system also processes the initial signal y(i,n) through a frequency and timing correction block 208 to correct for carrier frequency offset and provides, at the block output, the received signal starting from the first sample of a valid detected WiFi preamble. Then, the cyclic prefix (CP) for each OFDM symbol is discarded through a CP removal block 210. A FFT block 212 is used to obtain the frequency-domain signal for each OFDM symbol. The system 200 also includes a channel estimation block 214 to obtain an estimate for the channel experienced by the received signal. In addition, a symbol detector 216 is used to obtain an estimate for the log-likelihood ratios (LLRs) of the available bits per data symbol. Then, a hard decision block 218 decides whether each LLR corresponds to a zero-valued bit or a one-valued bit. The bits obtained from the hard decision block are fed to a symbol mapper 220 to regenerate estimates for the transmitted data symbols to be used for noise and interference power estimation during the data part reception. A mixer 215 scales the data symbols output by the FFT block 212 and a mixer 217 scales the channel output from the channel estimation block 214. The system 200 processes the output of the NIVar estimation from LLTF block 204 and the output of the NIVar estimation from data block 206 where both outputs are fed to the NIVar estimate combiner block 221 followed by a per-sub-band scaling computation block 222 that performs the task of updating the IW factor using the NIVar estimates obtained from L-LTF and from data through the use of a first-order low-pass filter to smooth out the estimates over time.

Figure 2B:
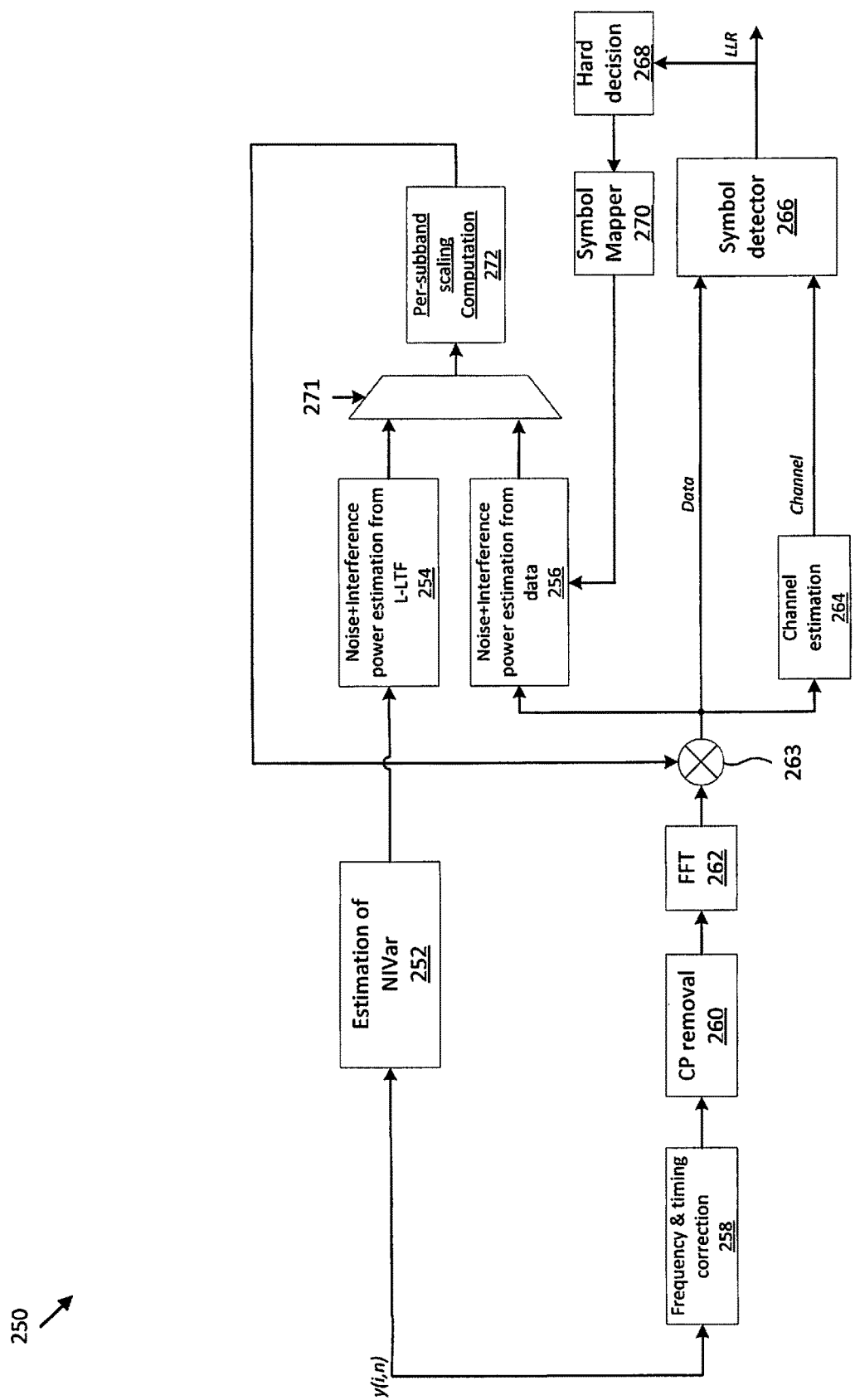
FIG. 2B illustrates a diagram of a system for providing sub-band whitening in the presence of partial-band interference, according to an embodiment.

FIG. 2B illustrates a diagram of a system for providing sub-band whitening in the presence of partial-band interference, according to an embodiment. A system 250 receives the initial signal y(i,n) for processing at the estimation of a NIVar estimation block 252. The initial signal may be in the time domain or the frequency domain. The system 250 includes a NIVar estimation from LLTF block 254 and a NIVar estimation from data block 256, the details of which will be described with reference to FIGS. 3-6. The system 250 also processes the initial signal y(i,n) through a frequency and timing correction block 258, a cyclic prefix (CP) removal block 260, and an FFT block 262. The system 250 also includes a channel estimation block 264, a symbol detector 266, a hard decision block 268, and a symbol mapper 270. The mixer 263 scales the data symbols output by the FFT block 262. In the embodiment shown in FIG. 2B, the data symbols are scaled at the output of the FFT block 262 and no scaling of the channel is necessary. The system 250 processes the output of the NIVar estimation from LLTF block 254 and the output of the NIVar estimation from data block 256 where both outputs are fed to a NIVar estimate combiner block 271 followed by a per-sub-band scaling computation block 272 which also utilizes the scaled data symbols scaled at the mixer 263.

Figure 3:
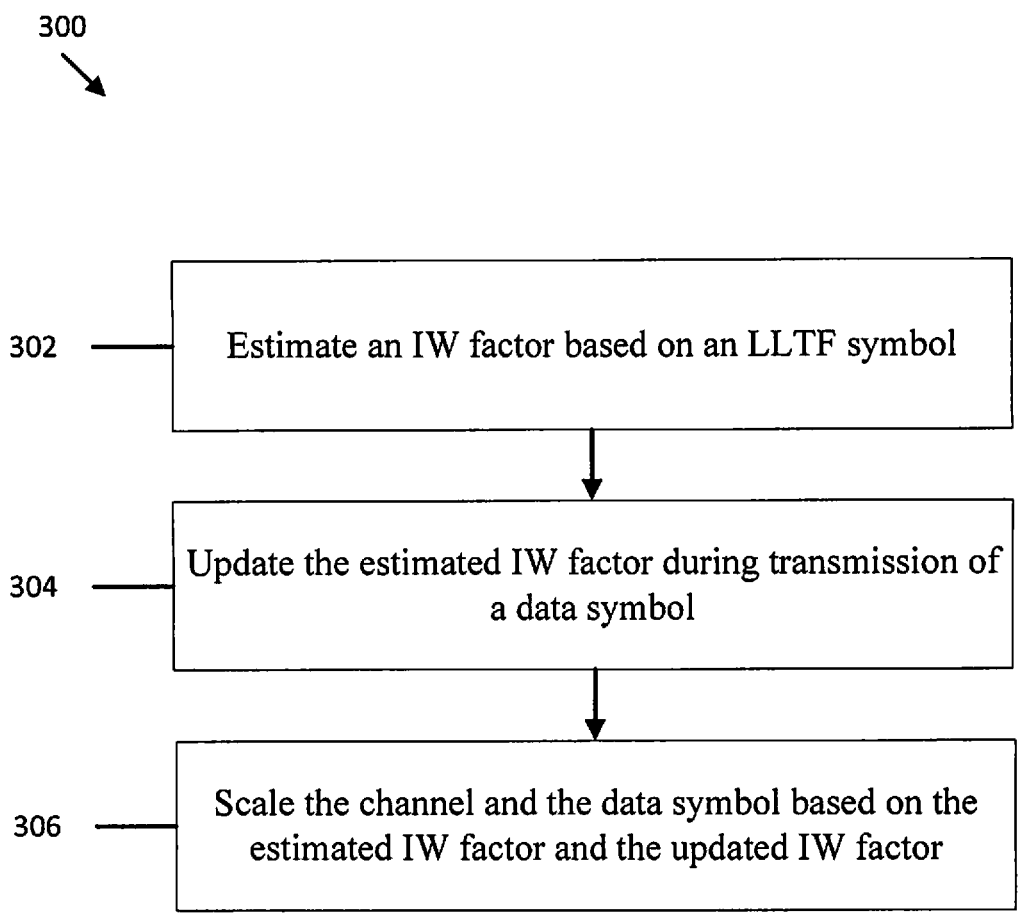
FIG. 3 illustrates a flowchart of a method for providing sub-band whitening in the presence of partial-band interference, according to an embodiment.

FIG. 3 illustrates a flowchart 300 of a method for providing sub-band whitening in the presence of partial-band interference, according to an embodiment. At 302, the present system estimates an IW factor based on an LLTF symbol. The system estimates an IW factor based on NIVar estimation at LLTF symbols.

Figure 4:
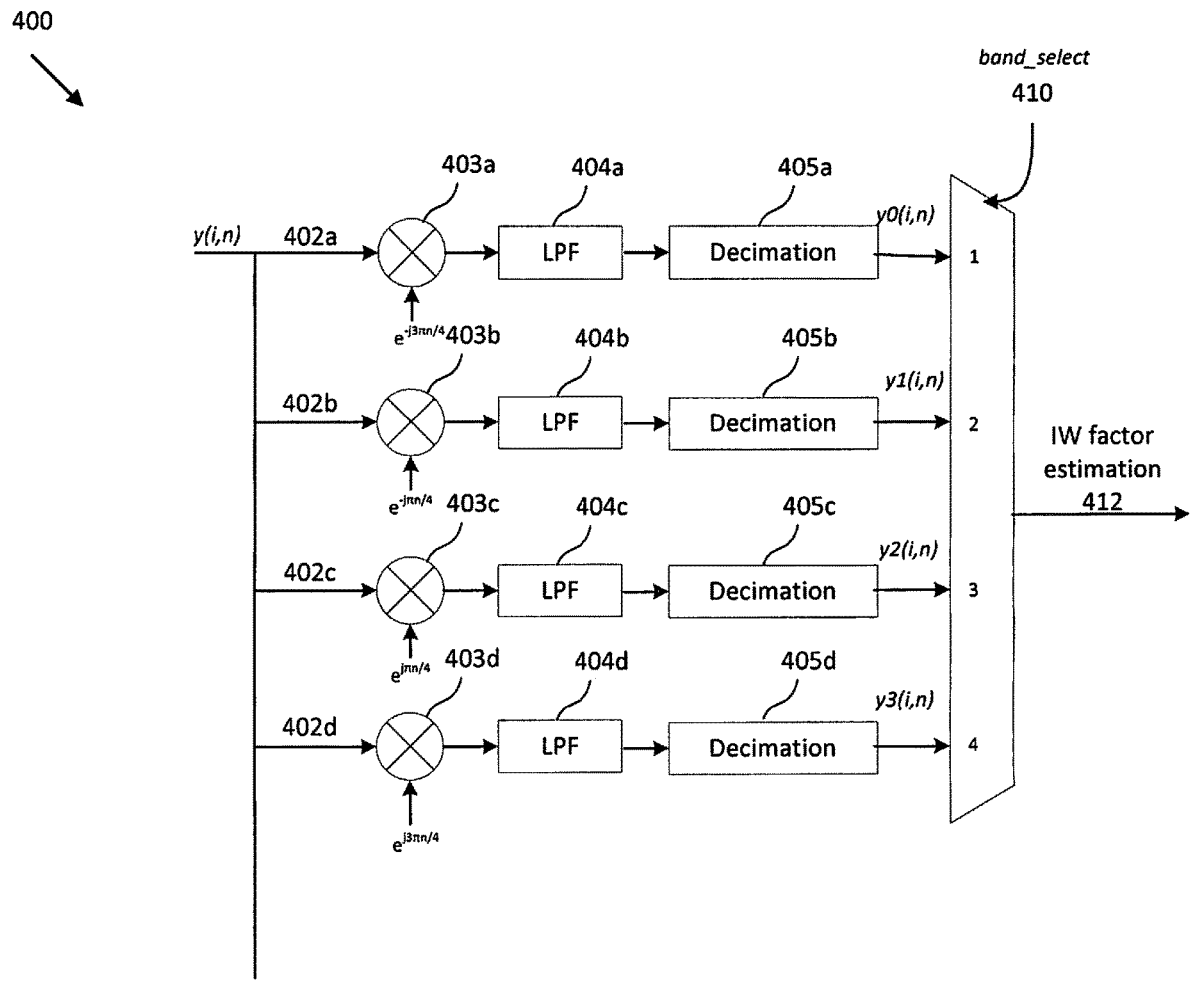
FIG. 4 illustrates a diagram of a system for estimation of noise and interference power (NIVar) in a time domain, according to an embodiment.

FIG. 4 illustrates a diagram of a system for estimation of NIVar in a time domain An input wide-band signal is split into four 20 MHz signals 402a, 402b, 402c, and 402d where the signal in each 20 MHz sub-band is frequency-translated into baseband via mixers 403a, 403b, 403c, and 403d and then low-pass filtered (LPF) at 404a, 404b, 404c, and 404d, respectively. For 40/80 MHz BSS bandwidths, either two or four branches may be considered for further processing, respectively, depending on the bandwidth detection output. Following the LPFs, the signals 402a, 402b, 402c, and 402d are decimated at 405a, 405b, 405c, and 405d, respectively, (down-sampled) by a factor of 2 or 4 for 40 or 80 MHz bandwidths, respectively. It is appreciated that the wideband signal may be split into signals with other bandwidths without deviating from the scope of the present disclosure. The system estimates the NIVar per sub-band, at the output of a band selection block 410, by processing the split sub-band signals in sequence. The NIVar per sub-band is estimated from the two LLTF identical segments and the system outputs an IW factor estimation 412.

Figure 5:
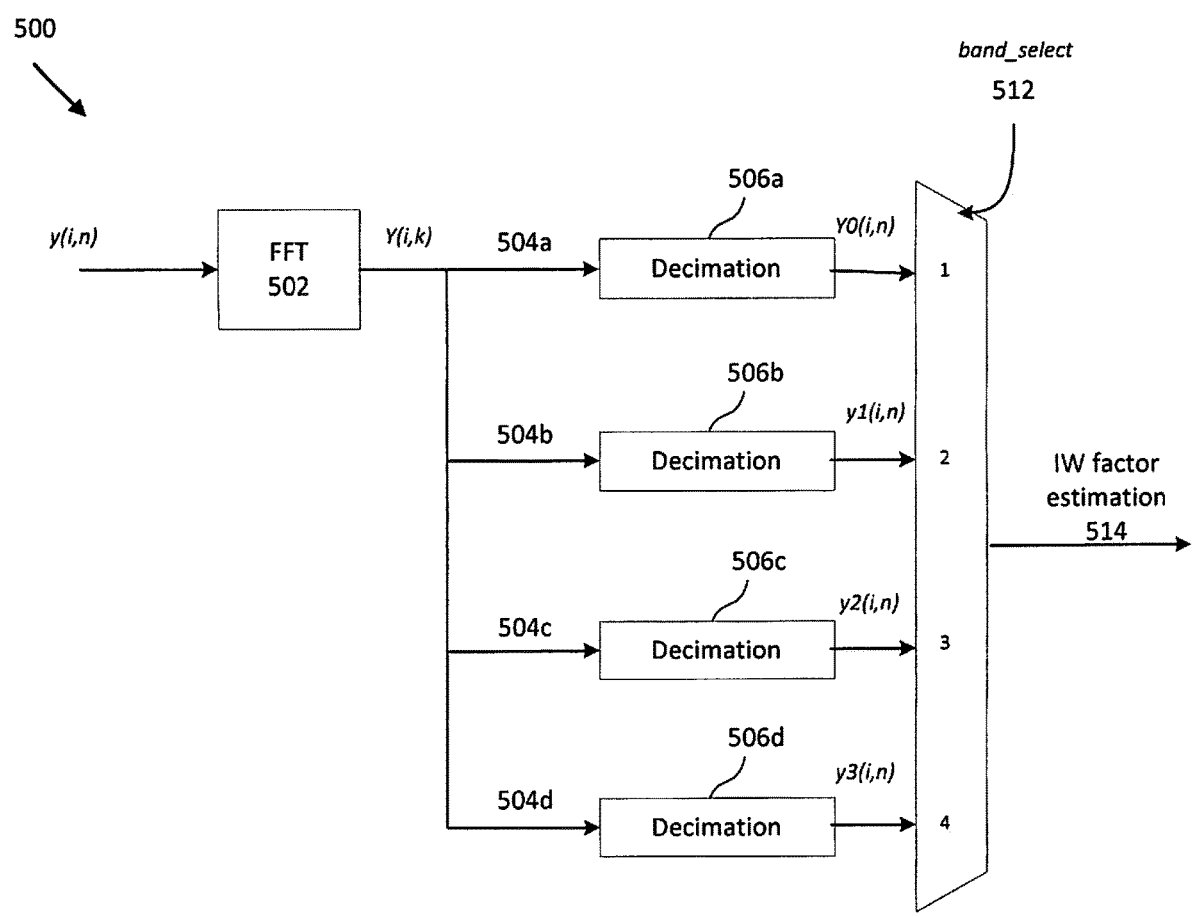
FIG. 5 illustrates a diagram of a system for estimation of NIVar in a frequency domain, according to an embodiment.

FIG. 5 illustrates a diagram of a system for estimation of NIVar in a frequency domain, according to an embodiment. The system 500 receives the time domain signal, performs an FFT operation at 502, and splits it into four 20 MHz signals 504a, 504b, 504c, and 504d and the signals are decimated at 506a, 506b, 506c, and 506d, respectively. The LPF function of FIG. 4 is not needed in the system 500. In this case, sub-band position is easily known for LLTF frequency-domain sequences. It is noted that the interference power may change during the packet transmission since an interfering packet arrival time and time span are random. Hence, the NIVar and hence the IW factor are updated and then smoothed through filtering during the packet transmission on an orthogonal frequency division multiplexing (OFDM)-block basis. The system estimates the NIVar per sub-band, at a band-selection block 512, by processing the split sub-band signals in sequence. The NIVar per sub-band is estimated from the two LLTF identical segments and the system outputs an IW factor estimation 514.

Figure 6:
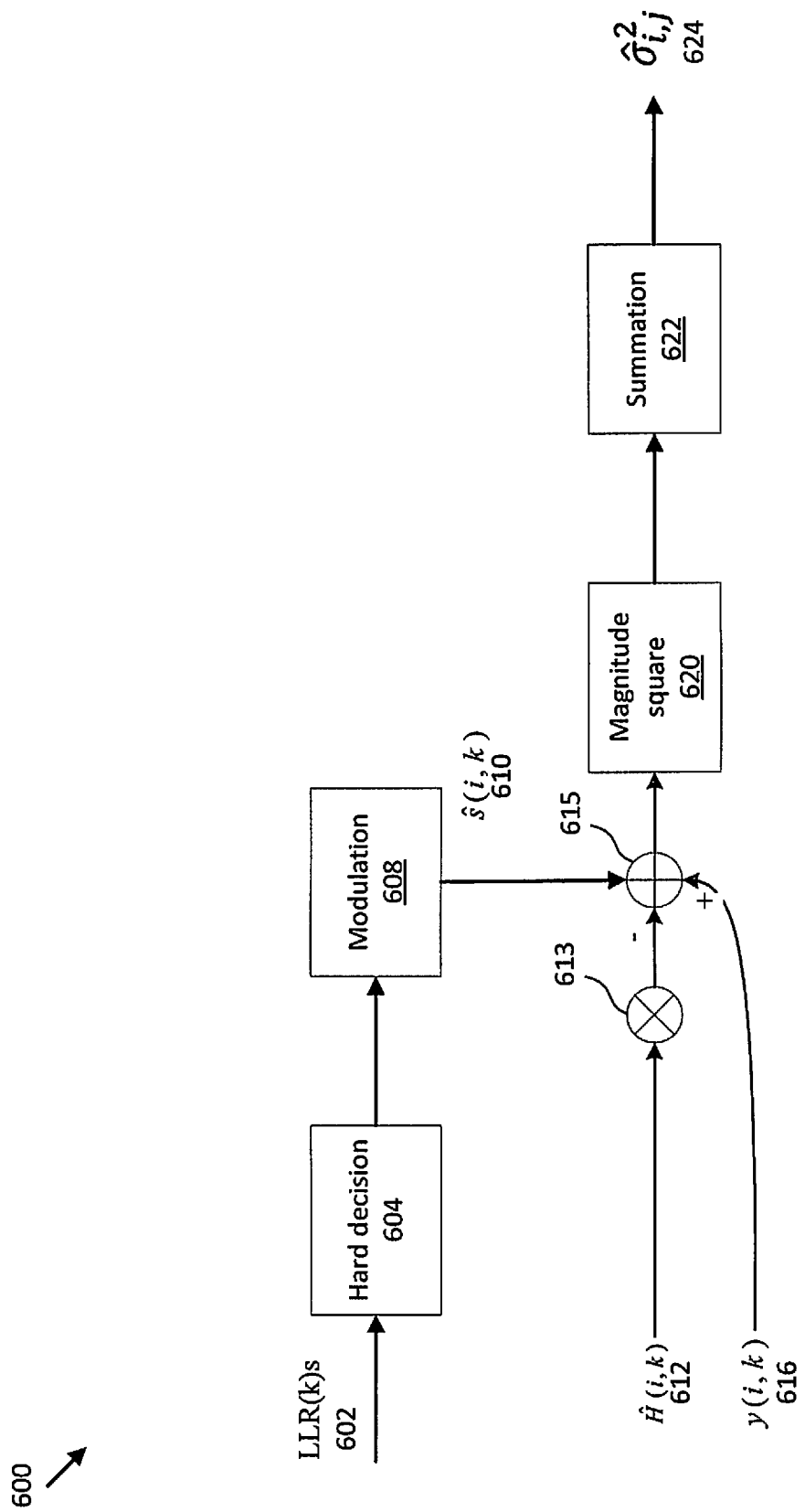
FIG. 6 illustrates a diagram of a system for NIVar estimation from data, according to an embodiment.

At 304, the present system updates the estimated IW factor during transmission of a data symbol. FIG. 6 illustrates a diagram of a system 600 for NIVar estimation from data, according to an embodiment. The system 600 includes a hard decision block 604, a modulation block 608, a magnitude square operation block 620, and a summation operation block 622. The system 600 utilizes three input quantities the LLR(k)s for a certain data symbol 602, the channel estimation (i,k) 612 and the frequency-domain received signal Y(i,k) 616. The channel estimation 612 is scaled at mixer 613, and the frequency-domain received signal 616 and the scaled channel estimation are summed at accumulator 615.

The frequency-domain received signal for the i-th symbol is defined as Equation (1):

$$Y(i,k) = \sum_{spatial\ streams} H(k)X(i,k) + (i,k) + N(i,k), \quad (1)$$

where k is the subcarrier index, I(i,k) is the interference, and N(i,k) is the noise. For each symbol, after symbol detection, the transmitted symbol can be regenerated based on the LLR 602 via the hard decision block 604 and the modulation block 608, which produces the regenerated symbol as $\hat{X}(i,k)$ 610. The noise and interference for this subcarrier can be estimated as Equation (2).

$$NI(i,k) = Y(i,k) - \sum_{spatial\ streams} \hat{H}(i,k)\hat{X}(i,k). \quad (2)$$

Assuming the interference and noise are zero mean, the noise interference power variance for each sub-band (20 MHz) can be estimated as Equation (3):

$$\hat{\sigma}_{i,j}^2 = \frac{\sum_{k \in subband\ i} |NI(i,k)|^2}{N_j}, \quad (3)$$

where $\sigma_{i,j}^2$ 624 (produced using the magnitude square operation block 620 and the summation operation block 622 as shown in Equation (3)) is the error vector magnitude (EVM) of the i-th symbol on j-th sub-band, and $N_j$ is the number of subcarriers in the j-th sub-band.

Referring back to FIG. 3, at 306, the present system scales the channel and/or the data symbol based on the estimated IW factor and the updated IW factor. Using the estimated noise-plus-interference power per sub-band, the frequency domain signal per sub-band may be scaled according to Equation (4):

$$\tilde{Y}(i,k) = Y(i,k) * S(i,j_k) \quad (4)$$

where $\tilde{Y}(i,k)$ is the frequency domain signal after scaling, $S(i,j_k)$ is the IW factor at the i-th symbol, and $j_k$-th sub-band ($j_k$ means that k-th subcarrier is in the $j_k$-th sub-band). The frequency domain signal per sub-band may also be scaled according to Equation (5):

$$S(i,j) = \sqrt{\frac{1/\hat{\sigma}_{i,j}^2}{1/N_d \sum_{m=1}^{N_d} 1/\hat{\sigma}_{i,m}^2}}, \quad j = 1, \ldots, N_d, \quad (5)$$

where S(i,j) is the scaling factor for the subcarriers that belong to the i-th symbol j-th sub-band, $\hat{\sigma}_{i,j}$ is the estimated NIVar on the j-th sub-band, and $N_d$ is the number of detected sub-bands.

The scaling factors may be normalized over the maximum scaling factor as an alternative to normalizing over the average of the scaling factors. Hence, the scaling factors can be rewritten as Equation (6).

$$S(i,j) = \frac{1/\hat{\sigma}_{i,j}}{\max_j 1/\hat{\sigma}_{i,j}}, \quad j = 1, \ldots, N_d, \quad (6)$$

Normalization by the maximum value sets the maximum of the resultant normalized factors to 1 and does not change the dynamic range of the data as might happen if it is chosen to normalize by the average value.

Figure 7:
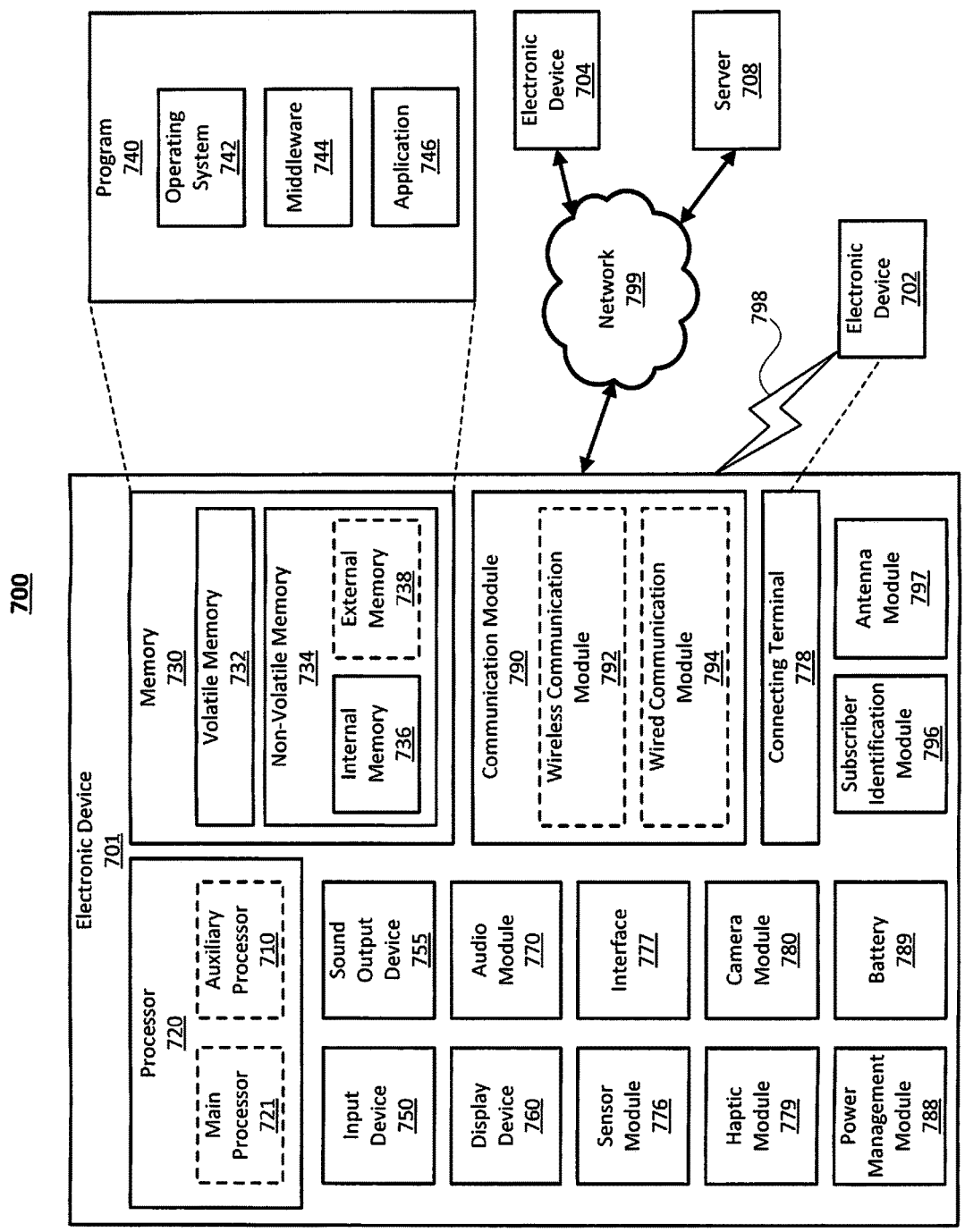
FIG. 7 illustrates a block diagram of an electronic device in a network environment, according to one embodiment.

FIG. 7 illustrates a block diagram of an electronic device 701 in a network environment 700; according to one embodiment. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for providing sub-band whitening, comprising:

estimating an interference whitening (IW) factor based on a legacy-long training field (LLTF) signal;

updating the estimated IW factor during transmission of a data symbol; and scaling the data symbol based on the updated IW factor and the estimated IW factor.

2. The method of claim 1, wherein the IW factor is based on noise and interference power (NIVar) estimation from two LLTF segments of the LLTF signal.

3. The method of claim 1, wherein the IW factor is updated based on a noise and interference power (NIVar) of a received signal and a symbol detection output.

4. The method of claim 1, further comprising splitting the LLTF signal into multiple signals.

5. The method of claim 4, wherein the LLTF signal is split into four signals.

6. The method of claim 5, wherein each of the four signals are in a 20 MHz sub-band.

7. The method of claim 1, wherein estimating the mid packet IW factor includes determining an error vector magnitude (EVM).

8. The method of claim 7, wherein the EVM is determined based on a channel estimation and a data signal.

9. The method of claim 1, further comprising scaling a channel, wherein scaling the channel is performed based on a scaling factor determined based on an error vector magnitude (EVM).

10. The method of claim 1, further comprising scaling a channel, wherein scaling the channel is performed based on a normalization of scaling factors.

11. A system for providing sub-band whitening, comprising:

a transceiver;

a memory; and a processor configured to:

estimate an interference whitening (IW) factor based on a legacy-long training field (LLTF) signal, update the estimated IW factor during transmission of a data symbol; and scale the data symbol based on the updated 1 W factor and the estimated IW factor.

12. The system of claim 11, wherein the IW factor is based on noise and interference power (NIVar) estimation from two LLTF segments of the LLTF signal.

13. The system of claim 11, wherein the IW factor is updated based on a noise and interference power (NIVar) of a received signal and a symbol detection output.

14. The system of claim 11, wherein the processor is further configured to split the LLTF signal into multiple signals.

15. The system of claim 14, wherein the LLTF signal is split into four signals.

16. The system of claim 15, wherein each of the four signals are in a 20 MHz sub-band.

17. The system of claim 11, wherein the processor is further configured to estimate the IW factor by determining an error vector magnitude (EVM).

18. The system of claim 17, wherein the EVM is determined based on a channel estimation and a data signal.

19. The system of claim 11, wherein the processor is further configured to scale a channel based on a scaling factor determined based on an error vector magnitude (EVM).

20. The system of claim 11, wherein the processor is further configured to scale a channel based on a normalization of scaling factors.

* * * * *